US 9,531,236 B2

(12) United States Patent
Filatov

(10) Patent No.: US 9,531,236 B2
(45) Date of Patent: Dec. 27, 2016

(54) ARRANGEMENT OF AXIAL AND RADIAL ELECTROMAGNETIC ACTUATORS

(75) Inventor: Alexei Filatov, Irvine, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 486 days.

(21) Appl. No.: 13/486,194

(22) Filed: Jun. 1, 2012

(65) Prior Publication Data

US 2012/0306305 A1     Dec. 6, 2012

Related U.S. Application Data

(60) Provisional application No. 61/492,719, filed on Jun. 2, 2011.

(51) Int. Cl.
*H02K 7/09* (2006.01)
*F16C 32/04* (2006.01)

(52) U.S. Cl.
CPC .............. *H02K 7/09* (2013.01); *F16C 32/0463* (2013.01)

(58) Field of Classification Search
CPC ................................ H02K 7/09; F16C 32/0463
USPC ............................................ 310/12.14, 90.5
IPC ....................................................... H02K 7/09
See application file for complete search history.

(56) References Cited

U.S. PATENT DOCUMENTS

| | | |
|---|---|---|
| 1,916,256 A | 7/1933 | Chandeysson |
| 2,276,695 A | 3/1942 | Lavarello |
| 2,345,835 A | 4/1944 | Serduke |
| 2,409,857 A | 10/1946 | Hines et al. |
| 2,917,636 A | 12/1959 | Akeley |
| 3,060,335 A | 10/1962 | Greenwald |
| 3,064,942 A | 11/1962 | Martin |
| 3,243,692 A | 3/1966 | Heissmeier et al. |
| 3,439,201 A | 4/1969 | Levy et al. |
| 3,937,533 A | 2/1976 | Veillette |
| 3,943,443 A | 3/1976 | Kimura et al. |
| 4,093,917 A | 6/1978 | Haeussermann |

(Continued)

FOREIGN PATENT DOCUMENTS

| | | |
|---|---|---|
| DE | 102006004836 A1 | 5/2007 |
| EP | 774824 | 5/1997 |

(Continued)

OTHER PUBLICATIONS

Office Action issued in U.S. Appl. No. 12/475,052 on Sep. 12, 2012, 8 pages.

(Continued)

*Primary Examiner* — John K Kim
(74) *Attorney, Agent, or Firm* — Fish & Richardson P.C.

(57) ABSTRACT

Systems, methods, and devices for generating electromagnetic forces may involve generating an axial control magnetic flux in an axial control magnetic circuit comprising a first axial pole, a second axial pole, and an axial actuator target, the axial actuator target coupled to a body having a rotational axis. A radial control flux can be generated in a radial control magnetic circuit comprising a first radial pole, a second radial pole, and a radial actuator target. An electrical compensation current can be applied to an electrical bias flux leveling coil to cancel or nearly cancel any changes of the magnetic flux leaking from either the first or the second axial poles into the radial poles, electrical bias flux leveling coil wound around the rotational axis and located axially between the radial poles and the closest of the first or the second axial poles.

16 Claims, 11 Drawing Sheets

(56) References Cited

U.S. PATENT DOCUMENTS

| | | |
|---|---|---|
| 4,127,786 A | 11/1978 | Volkrodt |
| 4,170,435 A | 10/1979 | Swearingen |
| 4,260,914 A | 4/1981 | Hertrich |
| 4,358,697 A | 11/1982 | Liu et al. |
| 4,362,020 A | 12/1982 | Meacher et al. |
| 4,415,024 A | 11/1983 | Baker |
| 4,535,289 A | 8/1985 | Abe et al. |
| 4,560,928 A | 12/1985 | Hayward |
| 4,635,712 A | 1/1987 | Baker et al. |
| 4,639,665 A | 1/1987 | Gary |
| 4,642,501 A | 2/1987 | Kral et al. |
| 4,659,969 A | 4/1987 | Stupak |
| 4,731,579 A | 3/1988 | Petersen et al. |
| 4,740,711 A | 4/1988 | Sato et al. |
| 4,806,813 A | 2/1989 | Sumi et al. |
| 4,918,345 A | 4/1990 | Vaillant de Guelis |
| 4,920,291 A | 4/1990 | McSparran |
| 4,948,348 A | 8/1990 | Doll et al. |
| 4,963,775 A | 10/1990 | Mori |
| 5,003,211 A | 3/1991 | Groom |
| 5,083,040 A | 1/1992 | Whitford et al. |
| 5,115,192 A | 5/1992 | Bardas et al. |
| 5,231,323 A | 7/1993 | New |
| 5,241,425 A | 8/1993 | Sakamoto et al. |
| 5,315,197 A | 5/1994 | Meeks et al. |
| 5,347,190 A * | 9/1994 | Lewis ............... F16C 32/0455 310/68 B |
| 5,481,145 A | 1/1996 | Canders et al. |
| 5,514,924 A | 5/1996 | McMullen et al. |
| 5,559,379 A | 9/1996 | Voss |
| 5,589,262 A | 12/1996 | Kiuchi et al. |
| 5,627,420 A | 5/1997 | Rinker et al. |
| 5,672,047 A | 9/1997 | Birkholz |
| 5,739,606 A | 4/1998 | Takahata et al. |
| 5,767,597 A | 6/1998 | Gondhalckar |
| 5,831,431 A | 11/1998 | Gottfried-Gottfried et al. |
| 5,939,879 A | 8/1999 | Wingate et al. |
| 5,942,829 A | 8/1999 | Huynh |
| 5,994,804 A | 11/1999 | Grennan et al. |
| 6,087,744 A | 7/2000 | Glauning |
| 6,130,494 A * | 10/2000 | Schob ............... F16C 32/0463 310/90.5 |
| 6,148,967 A | 11/2000 | Huynh |
| 6,167,703 B1 | 1/2001 | Rumez et al. |
| 6,191,511 B1 | 2/2001 | Zysset |
| 6,259,179 B1 | 7/2001 | Fukuyama et al. |
| 6,268,673 B1 | 7/2001 | Shah et al. |
| 6,270,309 B1 | 8/2001 | Ghetzler et al. |
| 6,304,015 B1 | 10/2001 | Filatov et al. |
| 6,313,555 B1 | 11/2001 | Blumenstock et al. |
| 6,325,142 B1 | 12/2001 | Bosley et al. |
| 6,359,357 B1 | 3/2002 | Blumenstock |
| 6,437,468 B2 | 8/2002 | Stahl et al. |
| 6,465,924 B1 | 10/2002 | Maejima |
| 6,664,680 B1 | 12/2003 | Gabrys |
| 6,700,258 B2 | 3/2004 | McMullen et al. |
| 6,727,617 B2 | 4/2004 | McMullen et al. |
| 6,794,780 B2 | 9/2004 | Silber et al. |
| 6,856,062 B2 | 2/2005 | Heiberger et al. |
| 6,876,194 B2 | 4/2005 | Lin et al. |
| 6,885,121 B2 * | 4/2005 | Okada ............... F16C 32/0444 310/181 |
| 6,897,587 B1 | 5/2005 | McMullen et al. |
| 6,925,893 B2 | 8/2005 | Abe et al. |
| 6,933,644 B2 | 8/2005 | Kanebako |
| 7,042,118 B2 | 5/2006 | McMullen et al. |
| 7,135,857 B2 | 11/2006 | Johnson |
| 7,217,039 B2 | 5/2007 | Baudelocque et al. |
| 7,557,480 B2 | 7/2009 | Filatov |
| 7,635,937 B2 * | 12/2009 | Brunet ............... F16C 32/0459 310/90.5 |
| 8,169,118 B2 | 5/2012 | Filatov |
| 2001/0017500 A1 | 8/2001 | Hirama et al. |
| 2001/0030471 A1 | 10/2001 | Kanebako |
| 2002/0006013 A1 | 1/2002 | Sato et al. |
| 2002/0175578 A1 | 11/2002 | McMullen et al. |
| 2003/0155829 A1 | 8/2003 | McMullen et al. |
| 2003/0197440 A1 | 10/2003 | Hasegawa et al. |
| 2004/0135450 A1 * | 7/2004 | Kanebako ............... 310/90.5 |
| 2004/0150278 A1 * | 8/2004 | Okada ............... F16C 32/0444 310/90.5 |
| 2005/0093391 A1 | 5/2005 | McMullen et al. |
| 2005/0242671 A1 | 11/2005 | Lin et al. |
| 2007/0056285 A1 | 3/2007 | Brewington |
| 2007/0063594 A1 | 3/2007 | Huynh |
| 2007/0164627 A1 * | 7/2007 | Brunet ............... F16C 32/0459 310/90.5 |
| 2007/0200438 A1 | 8/2007 | Kaminski et al. |
| 2007/0296294 A1 | 12/2007 | Nobe et al. |
| 2008/0211354 A1 | 9/2008 | Kim et al. |
| 2008/0211355 A1 | 9/2008 | Sakamoto et al. |
| 2008/0246373 A1 | 10/2008 | Filatov |
| 2008/0252078 A1 | 10/2008 | Myers |
| 2009/0004032 A1 | 1/2009 | Kaupert |
| 2009/0201111 A1 | 8/2009 | Filatov |
| 2009/0295244 A1 | 12/2009 | Ries |
| 2010/0007225 A1 | 1/2010 | Platon et al. |
| 2010/0090556 A1 | 4/2010 | Filatov |
| 2010/0117627 A1 | 5/2010 | Filatov |
| 2010/0215526 A1 * | 8/2010 | Saari et al. ............... 417/423.8 |
| 2010/0231076 A1 * | 9/2010 | Chiba ............... F16C 32/0459 310/90.5 |
| 2010/0301840 A1 | 12/2010 | Filatov |
| 2011/0101905 A1 | 5/2011 | Filatov |
| 2011/0163622 A1 | 7/2011 | Filatov et al. |
| 2011/0234033 A1 | 9/2011 | Filatov |
| 2012/0306305 A1 * | 12/2012 | Filatov ............... 310/90.5 |
| 2014/0265689 A1 | 9/2014 | Filatov |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |
| WO | WO2009/009451 A2 | 7/2009 |

OTHER PUBLICATIONS

Notice of Allowance issued in U.S. Appl. No. 12/610,766, on Oct. 19, 2012; 7 pages.

Office Action issued in U.S. Appl. No. 13/116,991 on Oct. 26, 2012; 13 pages.

Sortore, Christopher K. et al., "Design of Permanent Magnet Biased Magnetic Bearings for a Flexible Rotor" Presentation at the 44th MFPG Meeting, Virginia Beach, VA, Apr. 2-5, 1990 (10 pages).

Notice of Allowance issued in U.S. Appl. No. 13/116,991 on Mar. 7, 2013, 7 pages.

Office Action issued in U.S. Appl. No. 13/045,379 on Jun. 21, 2013, 19 pages.

Office Action issued in U.S. Appl. No. 12/985,211 on Jul. 5, 2013, 16 pages.

Office Action issued in U.S. Appl. No. 12/985,911 on Jan. 16, 2014, 10 pages.

Final Office Action issued in U.S. Appl. No. 13/045,379 on Nov. 27, 2013, 19 pages.

U.S. Appl. No. 13/116,991, filed May 26, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

(56) References Cited

OTHER PUBLICATIONS

Honeywell, "Genetron®245fa Applications Development Guide," (15 pages), 2000.
Hawkins, Lawrence A. et al., "Analysis and Testing of a Magnetic Bearing Energy Storage Flywheel with Gain-Scheduled, Mimo Control," Proceedings of ASME Turboexpo 2000, Munich, Germany, May 8-11, 2000, pp. 1-8.
McMullen, Patrick T. et al., "Combination Radial-Axial Magnetic Bearing," Seventh International Symposium on Magnetic Bearings, ETH Zurich, Aug. 23-25, 2000, pp. 473-478.
Hawkins, Lawrence et al., "Shock and Vibration Testing of an AMB Supported Energy Storage Flywheel," 8th International Symposium on Magnetic Bearings, Mito, Japan, Aug. 26-28, 2002, 6 pages.
McMullen, Patrick T. et al., "Design and Development of a 100 KW Energy Storage Flywheel for UPS and Power Conditioning Applications," 24th International PCIM Conference, Nuremberg, Germany, May 20-22, 2003, 6 pages.
Hawkins, Larry et al., "Development of an AMB Energy Storage Flywheel for Industrial Applications," 7th International Symposium on Magnetic Suspension Technology, Fukoka, Japan, Oct. 2003, 5 pages.
Freepower FP6,. "Freepower FP6 Specification & Dimensions for 6kWe Electricity Generating Equipment," (2 pages), 2000-2004, printed Jul. 26, 2006.
Hawkins, Larry et al., "Development of an AMB Energy Storage Flywheel for Commercial Application," International Symposium on Magnetic Suspension Technology, Dresden, Germany, Sep. 2005, 5 pages.
Freepower ORC Electricity Company with Industrial Processes, "Industrial Processes," (1 page), available at http://www.freepower.co.uk/site-5.htm, 2000-2006, printed Jul. 26, 2006.
Freepower ORC Electricity Company FP6 Product Description, "FP6," (1 page), available at http://www.freepower.co.uk/fp6.htm, 2000-2006, printed Jul. 26, 2006.
Freepower ORC Electricity Company FP120 Product Description, "FP120," (1 page), available at http://www.freepower.co.uk/fp120.htm, 2000-2006, printed Jul. 26, 2006.
Freepower ORC Electricity Company FP60 Product Description, "FP60," (1 page), available at http://www.freepower.co.uk/fp60.htm, 2000-2006, printed Jul. 26, 2006.
Freepower ORC Electricity Company Products Technical Overview "A System Overview," (1 page), available at http://www.freepower.co.uk/tech-overview.htm, 2000-2006, printed Jul. 26, 2006.
Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.
Huynh, Co et al., "Flywheel Energy Storage System for Naval Applications," GT 2006-90270, Proceedings of GT 2006 ASME Turbo Expo 2006: Power for Land, Sea & Air, Barcelona, Spain, May 8-11, 2006, pp. 1-9.

Freepower ORC Electricity Company Home Page, "Welcome to Freepower," (1 page) available at http://www.freepower.co.uk/, Jul. 18, 2006.
PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.
Ormat Web Site: "Recovered Energy Generation in the Cement Industry," (2 pages) available at http://www.ormat.com/technology_cement_2.htm, printed Jul. 26, 2006.
McMullen, Patrick et al., "Flywheel Energy Storage System with AMB's and Hybrid Backup Bearings," Tenth International Symposium on Magnetic Bearings, Martigny, Switzerland, Aug. 21-23, 2006, 6 pages.
International Search Report and Written Opinion of the International Searching Authority issued in International Application No. PCT/US2009/031837 on Sep. 7, 2009; 11 pages.
International Preliminary Report on Patentability issued in International Application No. PCT/US2009/031837 on Jul. 27, 2010, 6 pages.
International Search Report and Written Opinion of the International Searching Authority issued in International Application No. PCT/US2009/058816, mailed Jun. 10, 2010, 10 pages.
International Preliminary Report on Patentability issued in International Application No. PCT/US2009/058816 on Apr. 12, 2011, 5 pages.
Meeks, Crawford, "Development of a Compact, Lightweight Magnetic Bearing," 26th Annual AIAA/SAE/ASME/ASEE Joint Propulsion Conference, Jul. 16-18, 1990, 9 pages.
Ehmann et al., "Comparison of Active Magnetic Bearings With and Without Permanent Magnet Bias," Ninth International Symposium on Magnetic Bearings, Lexington, Kentucky, Aug. 3-6, 2004, 6 pages.
Office Action issued in U.S. Appl. No. 12/267,517 on Mar. 28, 2011, 9 pages.
Office Action issued in U.S. Appl. No. 12/569,559 on Apr. 25, 2011, 22 pages.
Notice of Allowance issued in U.S. Appl. No. 12/569,559 on Aug. 9, 2011, 9 pages.
Notice of Allowance issued in U.S. Appl. No. 12/358,172 on Sep. 20, 2011, 10 pages.
Notice of Allowance issued in U.S. Appl. No. 12/569,559 on Jan. 27, 2012, 6 pages.
Request for Continued Examination filed in U.S. Appl. No. 12/569,559 on Nov. 9, 2011, 13 pages.
Notice of Allowance issued in U.S. Appl. No. 12/267,517 on Feb. 21, 2012, 7 pages.
Amendment filed in U.S. Appl. No. 12/267,517 on Jan. 31, 2012, 9 pages.
Office Action issued in U.S. Appl. No. 12/475,052 on Jun. 19, 2012, 9 pages.

* cited by examiner

ARRANGEMENT OF AXIAL AND RADIAL ELECTROMAGNETIC ACTUATORS

CLAIM OF PRIORITY

This application claims priority under 35 USC §119(e) to U.S. Patent Application Ser. No. 61/492,719, filed on Jun. 2, 2011, the entire contents of which are hereby incorporated by reference.

FIELD

This application is directed to an arrangement of axial and radial electromagnetic actuators, and in particular axial and radial electromagnetic actuators for magnetic bearings.

BACKGROUND

Magnetic bearings may be used to support or suspend objects using magnetic fields generated by permanent magnets and/or electro-magnets. Such objects may include rotors, and the magnetic bearings may support the rotors to rotate within stators. Magnetic bearings may provide radial support (i.e., support in a radial direction relative to, e.g., a cylindrical rotor) and axial support (i.e., in a direction along the rotational axis of the rotor). A portion of a magnetic bearing responsible for generating a force may be referred to as an electromagnetic actuator. An electromagnetic actuator may exert a force on an object (such as rotor) by exposing a magnetically-permeable portion of the rotor, commonly referred to as an actuator target, to a non-uniform magnetic field. This force can be controlled by changing the field distribution around the target through the electrical currents that generate that field or a portion of that field. It is a common practice to have the magnetic field generating the force composed of two components: a constant bias magnetic field and a varying control magnetic field. With a proper design, this approach allows the resulting force be a linear function of a control current generating the varying control magnetic field, which significantly simplifies design of a control algorithm in magnetic bearings.

SUMMARY

The present disclosure is directed to maintaining a constant bias magnetic field in an electromagnetic actuator by compensating for a leakage field that may leak from another electromagnetic actuator located in the close proximity of the first actuator, e.g., from an axial electromagnetic actuator to a radial electromagnetic actuator, by using a bias flux leveling electrical coil located between two actuators and energized with an electrical current of certain magnitude and direction, which may be predefined functions of the control current and target position in the second actuator.

Certain aspects of the present disclosure are directed to systems, methods, and apparatuses, such as electromagnetic actuator systems, electric machine systems, and methods for generating axial and radial electromagnetic forces. For example, certain aspects of the present disclosure are directed to an electromagnetic actuator system that may include an axial actuator system and a radial actuator system. The axial actuator system may include a stationary first axial pole and a stationary second axial pole. The first and the second axial poles may be magnetically coupled to each other. A body may be configured to rotate about a rotational axis, and the first axial pole may be adjacent to and separated from a first end-facing surface of the body. The second axial pole may be adjacent to and separated from a second end-facing surface of the body. The first and second axial poles and the body may be configured to communicate magnetic flux. An electrical axial control coil may be configured to induce axial control magnetic flux flowing between the first axial pole and the first end-facing surface of the body as well as the second axial pole and the second end-facing surface of the body. The radial actuator system may include one or more radial poles that may be separated from the body and configured to communicate magnetic flux with the body. An electrical bias flux leveling coil wound around the rotational axis, located axially between the radial poles and the closest of either the first or the second axial poles and configured to produce magnetic flux in the one or more radial poles, the body, and the first and second axial poles.

Certain aspects of the disclosure are directed to a method of generating axial and radial electromagnetic forces. For example, an axial control magnetic flux can be generated in an axial control magnetic circuit. The axial control magnetic circuit can include a first axial pole, a second axial pole, and an axial actuator target. The axial actuator target may be coupled to a body having a rotational axis. The actuator target may have a first end-facing surface and a second end-facing surface, the first and second end-facing surfaces orthogonal or substantially orthogonal to the rotational axis. The term "substantially orthogonal" can mean a position or state relative to the rotational axis to achieve a result consistent with that achieved when the first and second end-facing surfaces are orthogonal to the rotational axis. The first axial pole and the second axial pole may be adjacent to and separated from the first and second end-facing surfaces, and the first axial pole and the second axial pole may be magnetically coupled to each other. A radial control flux can be generated in a radial control magnetic circuit that can include a first radial pole, a second radial pole, and a radial actuator target. The radial actuator target may have a cylindrical surface concentric or substantially concentric with the rotational axis. The term "substantially concentric" can mean a position or state relative to the rotational axis that achieves a result consistent with that achieved when the cylindrical surface is concentric with the rotational axis. The first radial pole and the second radial pole may be adjacent to and separated from the cylindrical surface of the radial actuator target, and the first and the second radial poles may be magnetically coupled to each other. An electrical compensation current can be applied to an electrical bias flux leveling coil to cancel or nearly cancel changes in the magnetic flux leaking from either the first or the second axial poles into the radial poles. The electrical bias flux leveling coil may be wound around the rotational axis and located axially between the radial poles and the closest of the first or the second axial poles.

An electric machine system may include a stator and a rotor. The rotor may include a rotational axis configured to move relative to the stator. The electric machine system may include an axial actuator system and a radial actuator system. An axial actuator system may include a stationary first axial pole and a stationary second axial pole, the first and the second axial poles may be magnetically coupled to each other. An axial actuator target may be [firmly] attached to the rotor. The first axial pole may be adjacent to and separated from a first end-facing surface of the axial actuator target and the second axial pole may be adjacent to and separated from a second end-facing surface of the axial actuator target. The first and second axial poles and the axial actuator target may be configured to communicate magnetic flux. An electrical axial control coil may be configured to induce axial control magnetic flux flowing between the first axial pole and the first end-facing surface of the axial actuator target and the second axial pole and the second end-facing surface of the axial actuator target. A radial actuator system may include one or more radial poles. A radial actuator target may be [firmly] attached to the rotor, the radial poles are adjacent to and separated from the peripheral surface of the radial actuator target. The radial poles may be further configured to communicate magnetic flux with the radial actuator target. An electrical radial control coil may be configured to induce radial control magnetic flux flowing between the radial poles and the peripheral surface of the radial actuator target. An electrical bias flux leveling coil wound around the rotational axis, located axially between the radial poles and the closest of either the first or the second axial poles and configured to produce magnetic flux in the one or more radial poles, the body, and the first and second axial poles.

In certain implementations, the magnetic flux produced by a current in the bias flux leveling coil in the one or more radial poles counteracts the leakage magnetic flux produced by a current in the axial control coil. The current in the bias flux leveling coil may be a function of the current in the axial control coil. The current in the bias flux leveling coil may be a function of both the current in the axial control coil and the axial position of the body.

In certain implementations, the rotor is coupled to an impeller.

In certain implementations, the rotor may be coupled to a driver, the driver comprising at least one of a motor, an engine, or a turbine.

In certain implementations, the electronic control package is configured to control the axial and radial control magnetic fluxes by energizing electrical axial and radial control coil with control currents. The magnetic fluxes may exert electromagnetic forces on the actuator target. In certain aspects, the electronic control package is further configured to energize the axial and radial control conductive coil with control currents in response to changes of signals from the position sensors so that the rotor is supported by electromagnetic forces without a mechanical contact with the stator.

The details of one or more embodiments are set forth in the accompanying drawings and the description below. Other features, objects, and advantages of the invention will be apparent from the description and drawings, and from the claims.

DESCRIPTION OF THE DRAWINGS

The magnetic field that generates the force may be composed of two components: a constant bias magnetic field and a varying control magnetic field. With a proper design, this approach allows the resulting force to be a linear function of a control current associated with that force, which significantly simplifies design of a control algorithm in magnetic bearings. To have a predictable dependence between the output force and the control current, the bias magnetic field has to stay constant. In practice, however, when two actuators (e.g., an axial actuator and a radial actuator) are located close to each other, changes of the control field or the target position in one actuator may affect the bias field in the other actuator.

FIGS. 4A and 1B are cross-sectional schematics of another example of an electromagnetic actuator arrangement per present invention having an electromagnetically-biased axial electromagnetic actuator with similar control current directions in two axial control coils, an electromagnetically-biased heteropolar radial electromagnetic actuator, and a bias flux leveling coil illustrating magnetic control flux path in the axial magnetic circuit.

DETAILED DESCRIPTION

Separate radial and axial electromagnetic actuators may be used in certain instances instead of single combination radial/axial actuators where the ratios between the axial and radial loads are significantly different from a factor of two, or where the axial actuator bandwidth is of importance. Typically, the separated radial and axial electromagnetic actuator arrangement should be compact, particularly in the axial direction (i.e., the axial separation distance between the axial electromagnetic actuator and the radial actuator should be kept minimal). Small separation distances between the axial and the radial actuators may result in a portion of the magnetic flux from the axial actuator leaking or deflecting into the radial actuator, affecting its operation. This leakage may occur especially in instances where a magnetically permeable rotor shaft is used. Since the amount of flux leaking from the axial actuator into the radial actuator may depend on the axial control current and may also depend on the axial position of the actuator target, its effects may be difficult to take into account in the radial actuator controls.

Figure 1A:
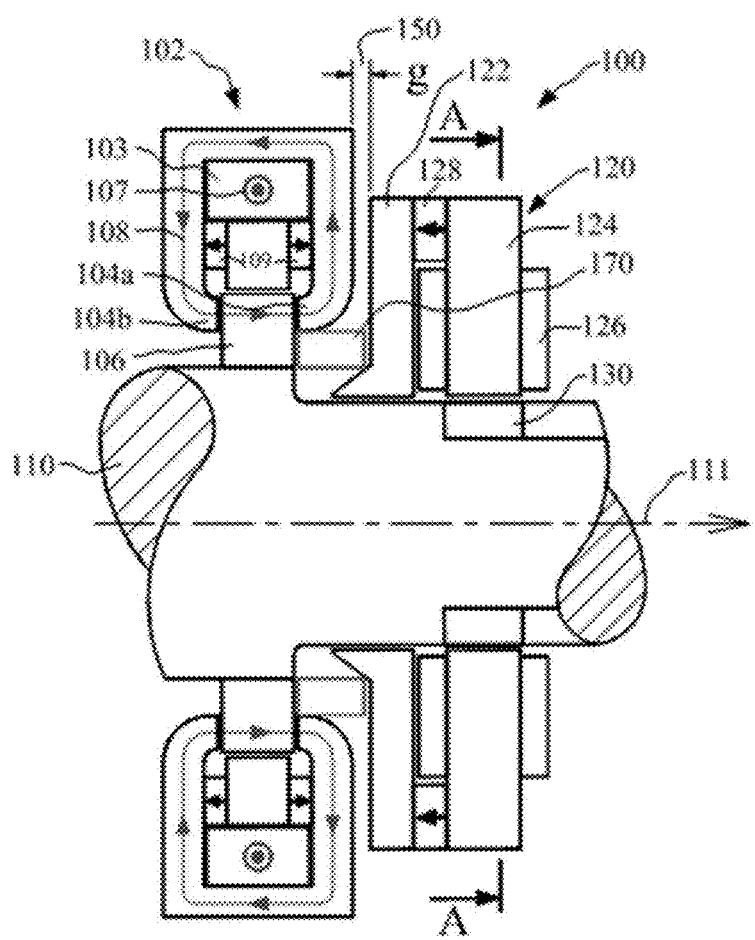
FIGS. 1A and 1B are cross-sectional schematics of an example electromagnetic actuator arrangement per the present invention having a permanent-magnet-biased axial electromagnetic actuator, a permanent-magnet-biased homopolar radial electromagnetic actuator, and a bias flux leveling coil illustrating nominal magnetic control flux path in the axial magnetic circuit.
Figure 1B:
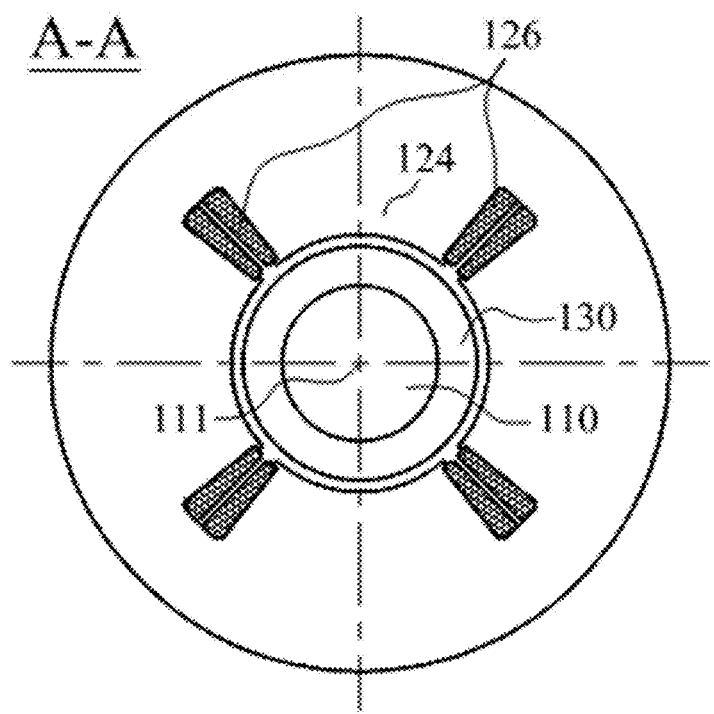
Figure 2:
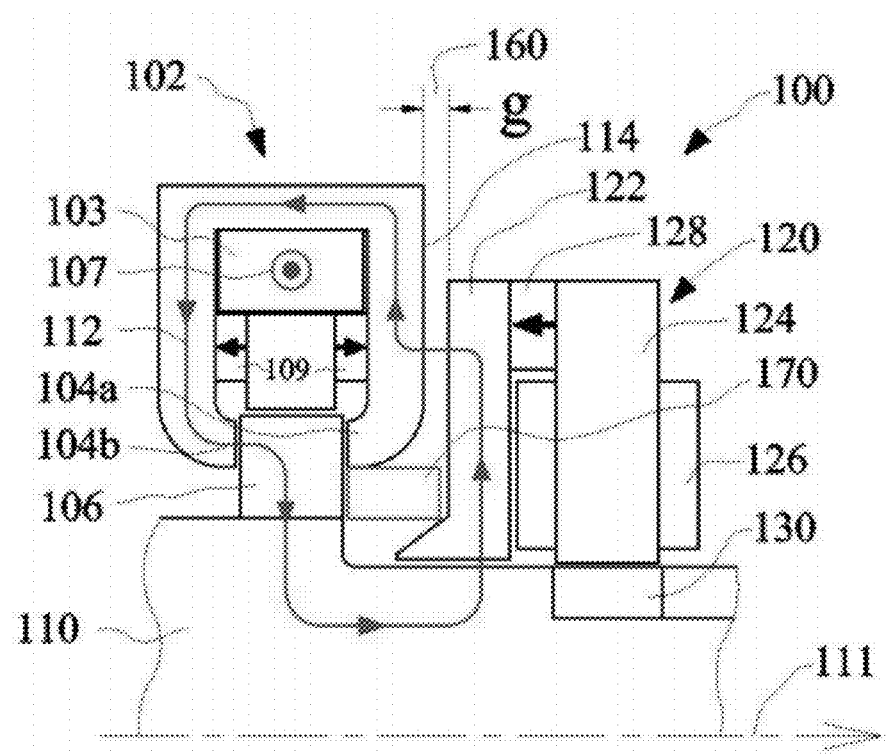
FIG. 2 is a cross-sectional schematic of an electromagnetic actuator arrangement per FIGS. 1A and 1B showing leakage of magnetic control flux from the magnetic circuit of the permanent-magnet-biased axial electromagnetic actuator into a pole of the permanent-magnet-biased homopolar radial electromagnetic actuator.
Figure 3:
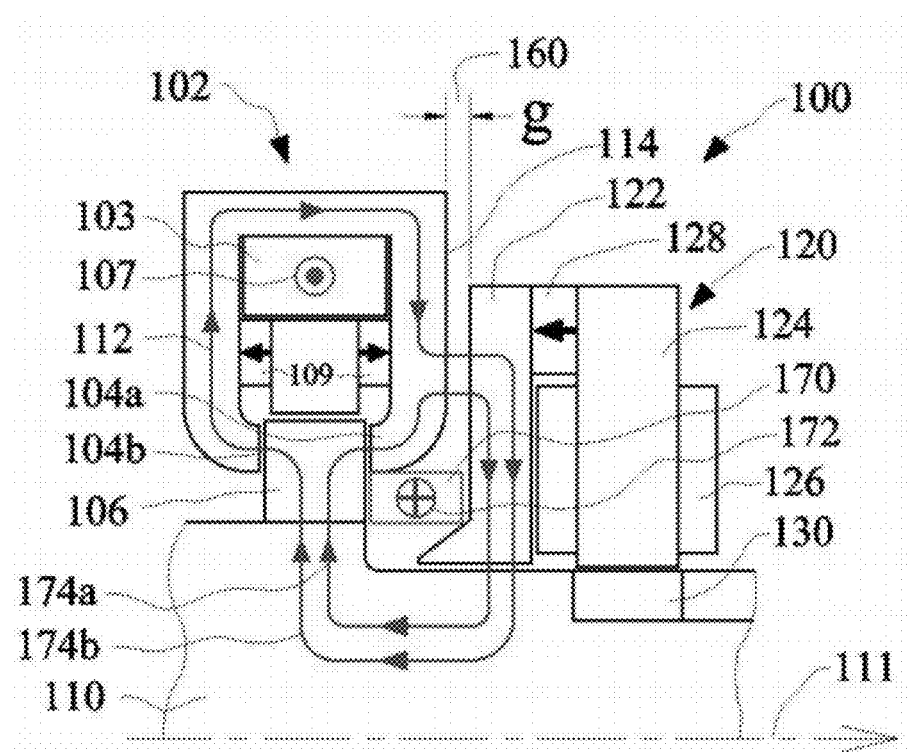
FIG. 3 is a cross-sectional schematic of an electromagnetic actuator arrangement per FIGS. 1A and 1B showing a compensation magnetic flux generated by the current flowing in the bias flux leveling coil that can counteract magnetic flux leaking from the axial electromagnetic actuator into the radial electromagnetic actuator.

FIGS. 1 through 3 illustrate one embodiment of the present invention using an arrangement 100 of a permanent-magnet-biased axial electromagnetic actuator 102, a permanent-magnet-biased homopolar radial electromagnetic actuator 120, and a bias flux leveling coil 170. An electromagnetic actuator may be referred to as permanent-magnet biased if a bias magnetic flux is generated by a permanent magnet rather than a current-carrying coil as would be the case in electromagnetically-biased actuators. Electromagnetic actuators may be further referred to as "homopolar" if in the absence of radial loading, the magnetic polarity stays the same or substantially the same around the rotor at a given axial position. Examples of homopolar actuators and differences between homopolar and heteropolar actuators are discussed in U.S. Pat. No. 8,169,118 "High-Aspect Ratio Homopolar Magnetic Actuator."

Even though FIGS. 1 through 3 show permanent-magnet-biased homopolar axial and radial actuators as an example, the same problem would exist and the same concepts presented herein may be used if other types of the electromagnetic actuators, such as electromagnetically-biased actuators were used, as will be discussed later on in this application.

FIGS. 1A and 1B are cross-sectional schematics of an example of an electromagnetic actuator arrangement 100 per the present invention having a permanent-magnet-biased axial electromagnetic actuator 102, a permanent-magnet-biased homopolar radial electromagnetic actuator 120, and a bias flux leveling coil 170. The axial electromagnetic actuator 102 is axially adjacent to the radial electromagnetic actuator 120 and separated from it by an axial gap 150.

Axial electromagnetic actuator 102 includes a first axial pole 104a and a second axial pole 104b, which are orthogonal (or substantially orthogonal) to the rotational axis 111. The axial poles 104a and 104b are adjacent to an axial actuator target 106, having end-facing surfaces that communicate magnetic flux 108 to/from the first and second axial poles 104a and 104b. The term "end-facing" refers to surfaces that are orthogonal (or substantially orthogonal) to the rotational axis 111 (which may be referred to as an axis of rotation or rotational axis). Magnets 109 may provide bias magnetic flux to a magnetic bias circuit of the axial electromagnetic actuator 102. Axial actuator target 106 may be affixed to a rotor 110 that is configured to rotate about the rotational axis 111. An axial control current 107 may be generated in one or more axial control coils 103. The axial control current 107 induces an axial control magnetic flux 108 in the control magnetic circuit of the axial electromagnetic actuator 102. The first and the second axial poles 104a and 104b together with the axial actuator target 106 (as well as other elements, such as an axial actuator backiron) make up some of the components of the magnetic bias and magnetic control circuits. The term "substantially orthogonal" is meant to include structural orientations that are not perfectly orthogonal but would achieve results consistent with or similar to such a structural orientation.

FIGS. 1A and 1B also show a permanent-magnet-biased homopolar radial electromagnetic actuator 120. As shown in FIG. 1B, radial electromagnetic actuator 120 includes at least three magnetically conductive and magnetically coupled to each other radial poles 124 having control windings 126 wound around them and positioned around the rotational axis 111. Control windings 126 may be configured to produce control magnetic fluxes in the radial poles 124. In addition, radial electromagnetic actuator 120 includes a dead pole 122 (dead pole 122 is capable of conducting magnetic flux, but, in certain instances, may not have control windings 126 wound around it to provide control magnetic fluxes). The control windings 126 may create a magnetic flux in the radial poles 124 that propagates in a magnetic control circuit that includes at least two radial poles 124 and the radial actuator target 130. The radial electromagnetic actuator 120 also includes a permanent magnet 128, which generates a bias magnetic field in a bias magnetic circuit comprising radial poles 124, dead pole 122, radial actuator target 130, and, in some cases, a portion of the rotor 110.

FIG. 1A further shows an electrical bias flux leveling coil 170, which is concentric with the rotational axis 111 and placed between the axial electromagnetic actuator 102 and the radial electromagnetic actuator 120.

FIG. 1A illustrates a nominal magnetic control flux path in the axial magnetic circuit which would occur if there were no bias flux leveling coil 170 (or it was not energized with a current) and an axial gap 150 between the axial electromagnetic actuator 102 and the radial electromagnetic actuator 120 was very big. Specifically, axial control magnetic flux 108 is shown to flow in the axial electromagnetic actuator 102 from the second axial pole 104b into the axial actuator target 106, then to the first axial pole 104a, and around the actuator. The nominal flux path can be achieved by increasing the axial gap 150 between the axial electromagnetic actuator 102 and the radial electromagnetic actuator 120. When the axial gap 150 between the actuators decreases, however, alternative magnetic flux paths may be created, such as leakage of the axial control magnetic flux 170 from an axial magnetic control circuit into the dead pole 122 (or other elements) of the radial electromagnetic actuator 120. Such a scenario is illustrated in FIG. 2.

FIG. 2 is a cross-sectional schematic of an electromagnetic actuator arrangement 100 per FIGS. 1A and 1B showing leakage of magnetic control flux (leakage flux 112) from the magnetic circuit of the permanent-magnet-biased axial electromagnetic actuator 102 into a dead pole 122 of the permanent-magnet-biased homopolar radial electromagnetic actuator 120. The gap 160 of FIG. 2 can be considered to be smaller than the axial gap 150 shown in FIG. 1A. In this example, leakage flux 112 leaks from the axial magnetic control circuit into the radial electromagnetic actuator 120. The leakage flux 112 propagates from the axial actuator target 106 into the rotor 110. The leakage flux 112 propagates through the rotor 110 and into the dead pole 122 of the radial electromagnetic actuator 120. The leakage flux 112 reenters the axial magnetic control circuit by crossing the gap 160 between a surface 114 of the axial electromagnetic actuator and the dead pole 122. FIG. 2 shows that when a magnetically permeable shaft is used and a radial electromagnetic actuator 120 is located close to the axial electromagnetic actuator 102, a part of the leakage flux 112 may leak into the radial electromagnetic actuator 120 (only the leakage into the dead pole 122 is shown for simplicity, but there also may be a leakage into the active radial poles 124). This leakage flux 112 can affect bias flux in the radial electromagnetic actuator 120, and consequently, many actuator parameters such as gain, negative stiffness, and load capacity.

FIG. 3 is a cross-sectional schematic of an electromagnetic actuator arrangement 100 per FIGS. 1A and 1B showing a compensation magnetic flux 174a and 174b generated by the current 172 flowing in the bias flux leveling coil 170 that can counteract (or cancel or nearly cancel) changes in magnetic flux leaking from the axial electromagnetic actuator 102 into the radial electromagnetic actuator 120. The electrical bias flux leveling coil 170 is concentric with the rotational axis 111 and placed between the axial electromagnetic actuator 102 and the radial electromagnetic actuator 120. This leveling coil 170 is energized with an electric current 172 opposite to the axial control current 107 in the axial electromagnetic actuator 102. In instances where the leakage flux 112 into the radial electromagnetic actuator 120 is only affected by the axial control current 107, the bias flux leveling coil 170 can be connected in series with the axial control coil 103 and energized with the same current. If the axial rotor displacement also affects the leakage flux 112 into the radial electromagnetic actuator 120, a current in the bias flux leveling coil 170 may have to be a function of both the axial control current 107 and the axial position of the rotor 110. In this case, a separate amplifier may be used to generate the compensation current 172.

A current 172 in the bias flux leveling coil 170 produces a compensation magnetic flux (174a and 174b), which, within the radial electromagnetic actuator 120, opposes a change of the flux leaking from the axial electromagnetic actuator 102 (i.e., leakage flux 112 of FIG. 2). Within the axial electromagnetic actuator 102, the compensation magnetic flux (174a and 174b) divides into two portions, each going into one of the axial poles (104a and 104b, respectively). In effect, the compensation fluxes 174a and 174b add to or subtract from the bias flux (generated by magnets 109) in the axial electromagnetic actuator 102. As such, the "force-vs-current" dependence of the axial electromagnetic actuator 102 may be somewhat non-linear, and subsequent linearization may be needed. In practice, however, in most cases the compensation magnetic fluxes 174a and 174b are much smaller than the bias flux and the non-linearity can be ignored.

Figure 4A:
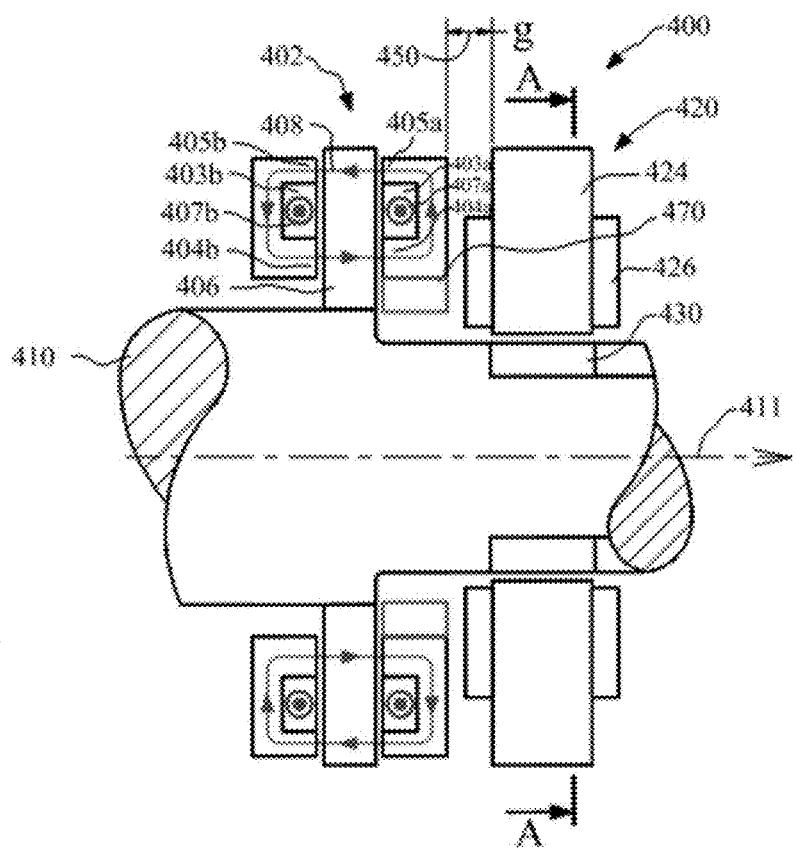
Figure 4B:
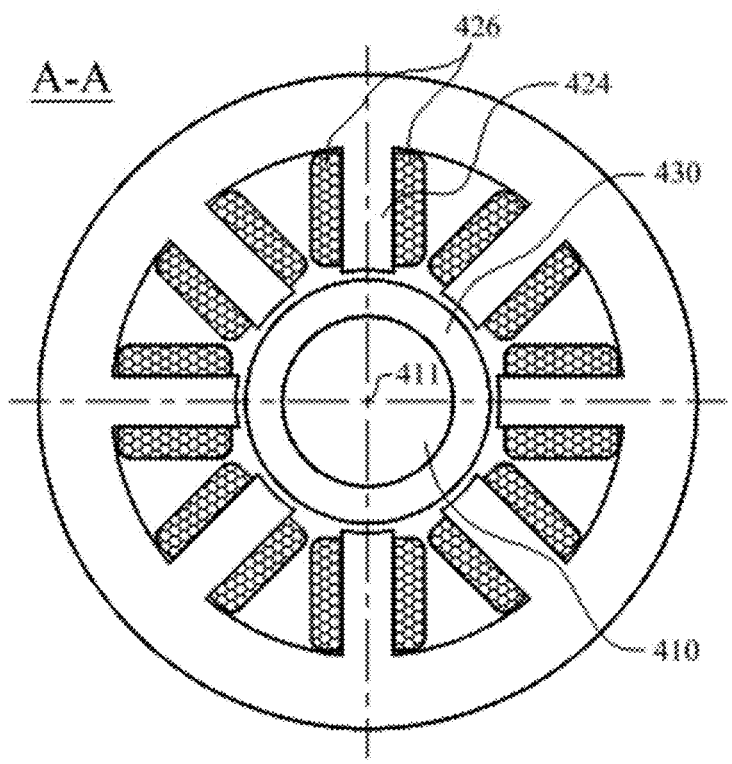

FIGS. 4 (which includes FIGS. 4A and 4B), 5 and 6 use an arrangement 400 of electromagnetically-biased axial electromagnetic actuator 402 with similar control current directions in two axial control coils 403a and 403b, an electromagnetically-biased homopolar radial electromagnetic actuator 420 and a bias flux leveling coil 470 to give another example of an implementation of the present invention. An electromagnetic actuator may be referred to as electromagnetically-biased if a bias magnetic flux is generated by a current-carrying coil rather than a permanent magnet. Electromagnetic actuators may be further referred to as "heteropolar" if in the absence of radial loading, the magnetic polarity varies around the rotor at a given axial position. Differences between homopolar and heteropolar actuators are discussed in U.S. Pat. No. 8,169,118 "High-Aspect Ratio Homopolar Magnetic Actuator."

FIGS. 4A and 4B are cross-sectional schematics of an electromagnetic actuator arrangement 400 having an electromagnetically-biased axial electromagnetic actuator 402 with similar control current directions in two axial control coils 403a and 403b (the control currents 407a and 407b are in the same direction), an electromagnetically-biased heteropolar radial electromagnetic actuator 420, and a bias flux leveling coil 470. The axial electromagnetic actuator 402 is shown as axially adjacent to the radial electromagnetic actuator 420.

Axial electromagnetic actuator 402 includes a first pair of axial poles 404a and 405a located on one side of an axial actuator target 406 and a second pair of axial poles 404b and 405b, located on the other side of the axial actuator target 406. The axial poles 404a, 404b, 405a and 405b are adjacent to end-facing surfaces of the axial actuator target 406 that communicate magnetic flux 408 to/from the axial poles 404a, 404b, 405a and 405b. The term "end-facing" refers to surfaces that are orthogonal (or substantially orthogonal) to the rotational axis 411. Axial actuator target 406 may be affixed to a rotor 410 that is configured to rotate about the rotational axis 411 (which may be referred to as an axis of rotation or rotational axis). Axial control currents 407a and 407b may be generated in axial control coils 403a and 403b. In addition, the same coils 403a and 403b or additional collocated coils may carry constant bias currents (not shown). The control currents 407a and 407b induce an axial control magnetic flux 408 in the control magnetic circuit of the axial electromagnetic actuator 402. The axial poles 404a, 404b, 405a and 405b together with the axial actuator target 406 (as well as other elements, such as an axial actuator backiron) make up some of the components of the magnetic bias and magnetic control circuits.

FIGS. 4A and 4B also show an electromagnetically-biased heteropolar radial electromagnetic actuator 420. As shown in FIG. 4B, radial electromagnetic actuator 420 includes a plurality of magnetically conductive and magnetically coupled to each other radial poles 424 having control windings 426 wound around them and positioned around the rotational axis 411. In addition, the radial poles 424 may have bias windings wound around them (not shown). In some cases, windings 426 may combine functions of the bias and control windings 426. Control windings 426 are configured to produce control magnetic fluxes in the radial poles 424. The control windings 426 may create a magnetic flux in the radial poles 424 that propagates in a magnetic control circuit that includes at least two radial poles 424 and the radial actuator target 430.

FIG. 4A illustrates a nominal magnetic control flux path in the axial magnetic circuit, which would occur if there were no bias flux leveling coil 470 (or it was not energized with a current) and an axial gap 450 between the axial electromagnetic actuator 402 and the radial electromagnetic actuator 420 was very big. Specifically, magnetic axial control magnetic flux 408 is shown to flow in the axial electromagnetic actuator 402 from the second axial pole 404b, into the axial actuator target 406, then to the first axial pole 404a, then from the third axial 405a back into the axial actuator target 406, then to the fourth axial pole 405b and back to the second axial pole 404b to complete the loop. The nominal flux distribution can be achieved by increasing the axial gap 450 between the axial electromagnetic actuator 402 and the radial electromagnetic actuator 420. When the axial gap 450 between the actuators decreases, however, alternative magnetic flux paths may be created, such as leakage of the axial control magnetic flux from an axial magnetic control circuit into the radial poles 424. Such a scenario is illustrated in FIG. 5.

Figure 5:
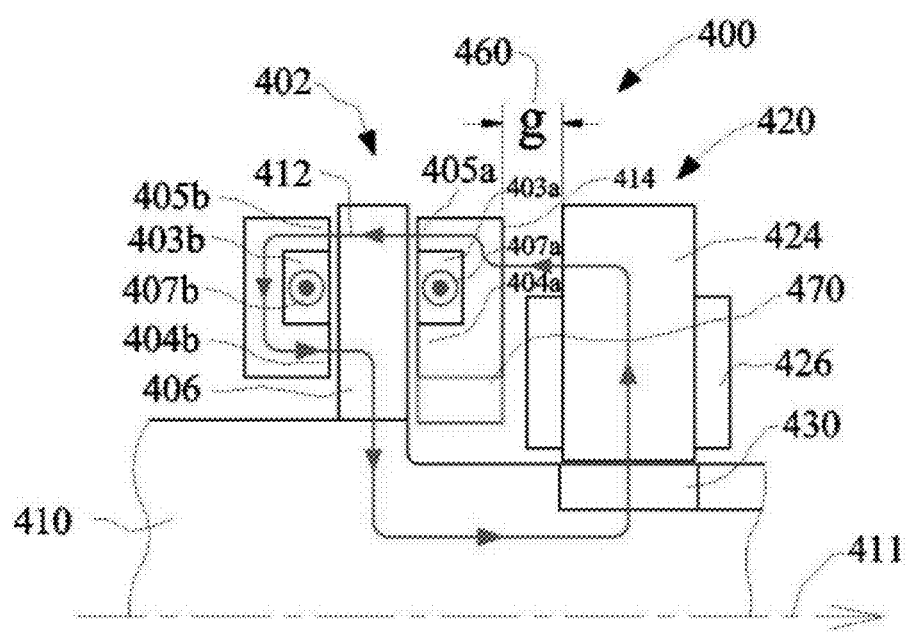
FIG. 5 is a cross-sectional schematic of an electromagnetic actuator arrangement per FIGS. 4A and 4B showing leakage of magnetic flux from the magnetic circuit of the electromagnetically-biased axial electromagnetic actuator into a pole of the electromagnetically-biased heteropolar radial electromagnetic actuator.

FIG. 5 is a cross-sectional schematic of an electromagnetic actuator arrangement 400 per FIGS. 4A and 4B showing leakage of magnetic flux from the magnetic circuit of the electromagnetically-biased axial electromagnetic actuator 402 into a radial pole 424 of the electromagnetically-biased heteropolar radial electromagnetic actuator 420. The gap 460 of FIG. 5 can be considered to be smaller than the gap 450 shown in FIG. 4A. In this example, leakage flux 412 leaks from the axial magnetic control circuit into the radial electromagnetic actuator 420. The leakage flux 412 propagates from the axial actuator target 406 into the rotor 410. The leakage flux 412 propagates through the rotor 410 and into the radial control pole 424 of the radial electromagnetic actuator 420. The leakage flux 412 reenters the axial magnetic control circuit by crossing the gap 460 between a surface 414 of the axial electromagnetic actuator and the radial control pole 424. FIG. 5 shows that when a magnetically permeable shaft is used and a radial electromagnetic actuator 420 is located close to the axial electromagnetic actuator 402, a part of the leakage flux 412 may leak into the radial electromagnetic actuator 420. This leakage flux 412 can affect bias flux in the radial electromagnetic actuator 420, and consequently, many actuator parameters such as gain, negative stiffness, and load capacity.

Figure 6:
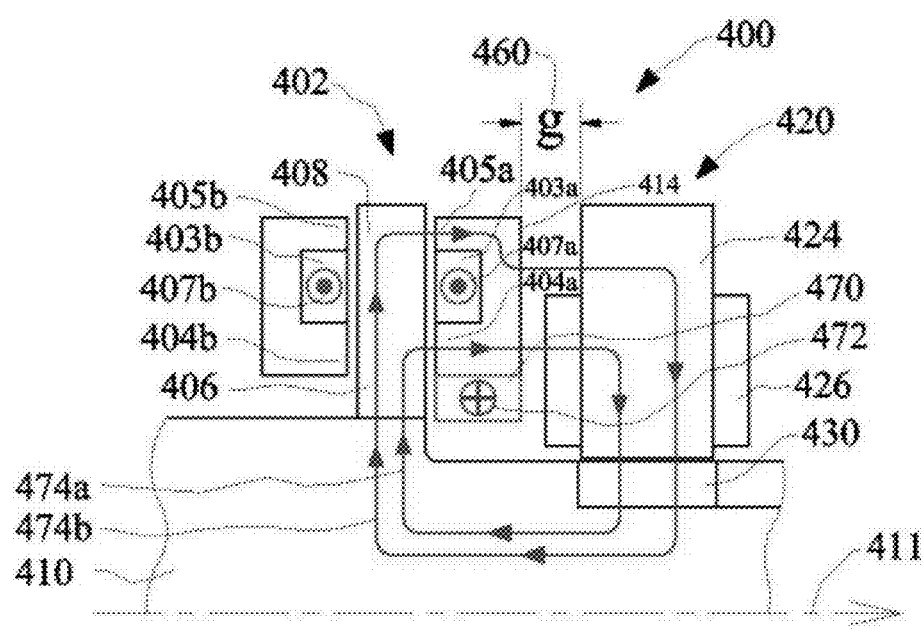
FIG. 6 is a cross-sectional schematic of an electromagnetic actuator arrangement per FIGS. 4A and 4B showing a compensation flux generated by a current flowing in the bias flux leveling coil that can counteract the magnetic flux leaking from the axial electromagnetic actuator into the radial electromagnetic actuator.

FIG. 6 is a cross-sectional schematic of an electromagnetic actuator arrangement 400 per FIGS. 4A and 4B showing a compensation magnetic flux 474a and 474b generated by the current 472 flowing in the bias flux leveling coil 470 that can counteract the magnetic flux leaking from the axial electromagnetic actuator 402 into the radial electromagnetic actuator 420. In FIG. 6, the control currents are in the same direction. The electrical bias flux leveling coil 470 is concentric with the rotational axis 411 and placed between the axial electromagnetic actuator 402 and the radial electromagnetic actuator 420. This coil 470 is energized with an electric current 472 opposite to the axial control currents 407a and 407b in the axial electromagnetic actuator 402. In instances where the only problem is the effect of the axial control currents 407a and 407b on the radial electromagnetic actuator 420, the bias flux leveling coil 470 can be connected in series with the axial control coils 403a and/or 403b and energized with the same current. If the axial rotor displacement also affects the leakage flux 412 into the radial electromagnetic actuator 420, a current in the bias flux leveling coil 470 will have to be a function of both the axial control currents 407a, 407b and the axial position of the rotor 410. In this case, a separate amplifier can be used to generate the compensation current 472.

A current 472 in the bias flux leveling coil 470 produces a compensation flux (474a and 474b), which, within the radial actuator 420, opposes a change of the flux leaking from the axial electromagnetic actuator 402 (i.e., leakage flux 412 of FIG. 5). Within the axial electromagnetic actuator 402, the compensation flux divides into two portions (474a and 474b), each going into one of the axial poles closest to the radial poles 424 (404a and 405a, respectively). This may make the "force-vs-current" dependence of the axial electromagnetic actuator 402 somewhat non-linear, and subsequent linearization may be needed. In practice, however, in most cases the compensation fluxes 474a and 474b are much smaller than the bias flux and the non-linearity can be ignored.

Figure 7:
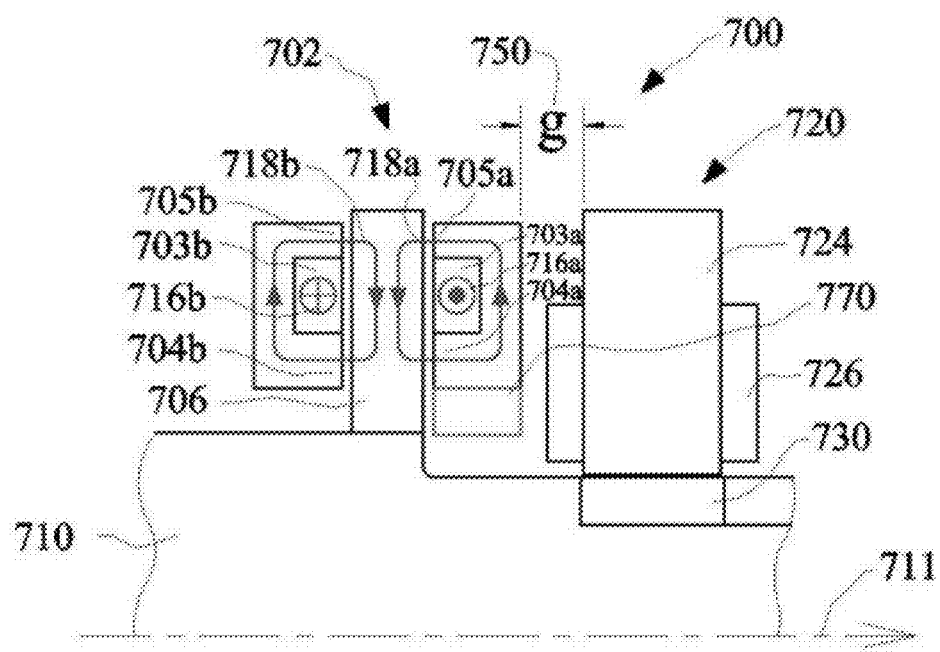
FIG. 7 is a cross-sectional schematic of yet another example of an electromagnetic actuator arrangement having an electromagnetically-biased axial electromagnetic actuator with different control current directions in two axial control coils, an electromagnetically-biased heteropolar radial electromagnetic actuator, and a bias flux leveling coil illustrating magnetic control flux path in the axial magnetic circuit.
Figure 8:
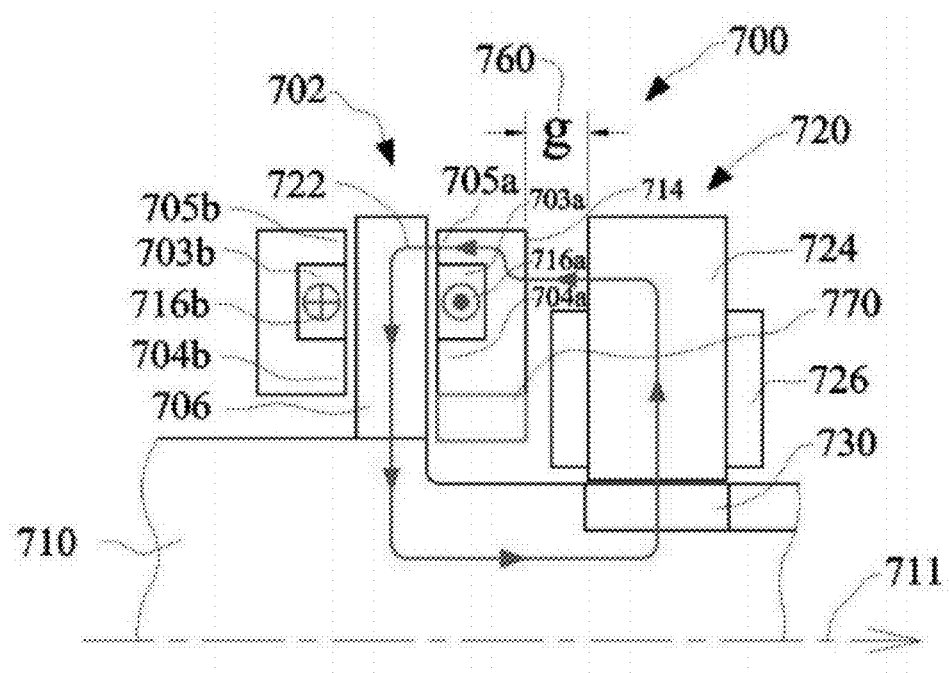
FIG. 8 is a cross-sectional schematic of the electromagnetic actuator arrangement per FIG. 7 showing leakage of magnetic flux from the magnetic circuit of the electromagnetically-biased axial electromagnetic actuator into a pole of the electromagnetically-biased heteropolar radial electromagnetic actuator.
Figure 9:
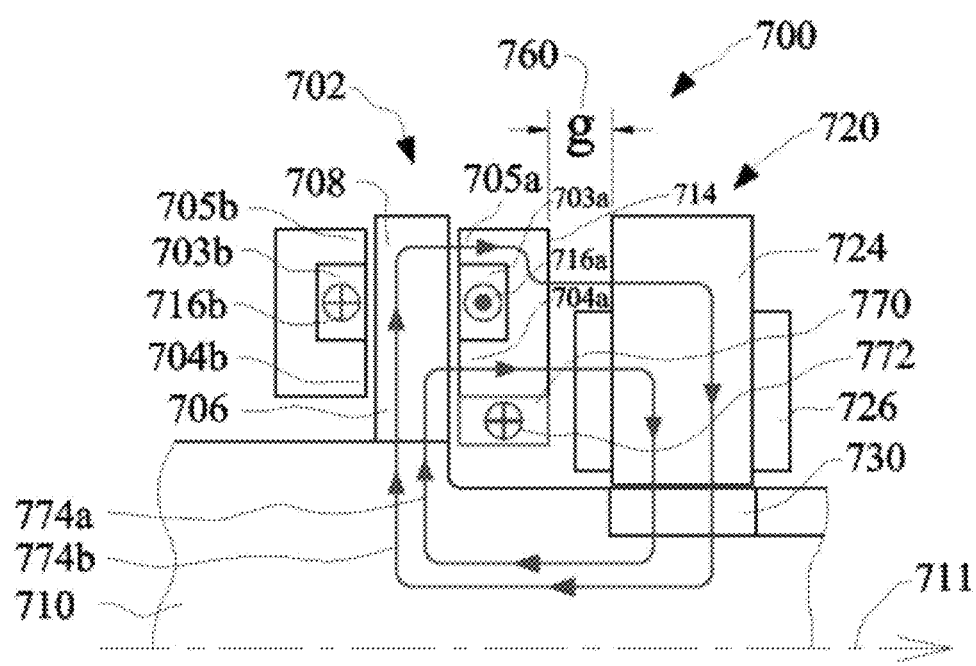
FIG. 9 is a cross-sectional schematic of an electromagnetic actuator arrangement per FIG. 7 showing a compensation flux generated by a current flowing in the bias flux leveling coil that can counteract the magnetic flux leaking from the axial electromagnetic actuator into the radial electromagnetic actuator.

FIGS. 7, 8 and 9 show another embodiment of the present invention, which, similarly to the embodiment shown in FIGS. 4 through 6, includes an electromagnetically-biased axial electromagnetic actuator 702, an electromagnetically-biased heteropolar radial electromagnetic actuator 720, and a bias flux leveling coil 770, but has directions of control currents 716a and 716b in the axial control coils 703a and 703b opposite from each other (whereas in FIGS. 4 through 6 the directions of control currents 407a and 407b were the same).

FIG. 7 is a cross-sectional schematic of yet another example of an electromagnetic actuator arrangement 700 having an electromagnetically-biased axial electromagnetic actuator 702 with different control current directions in two axial control coils, an electromagnetically-biased heteropolar radial electromagnetic actuator 720, and a bias flux leveling coil 770 illustrating magnetic control flux path in the axial magnetic circuit.

FIG. 7 illustrates two nominal axial magnetic control fluxes paths 718a and 718b which would occur if there were no bias flux leveling coil 770 (or it was not energized with a current) and an axial gap 750 between the axial electromagnetic actuator 702 and the radial electromagnetic actuator 720 was very big.

FIG. 8 is a cross-sectional schematic of the electromagnetic actuator arrangement 700 of FIG. 7 showing leakage of magnetic flux from the magnetic circuit of the electromagnetically-biased axial electromagnetic actuator 702 into a pole 724 of the electromagnetically-biased heteropolar radial electromagnetic actuator 720. If the separation distance 760 between the axial electromagnetic actuator 702 and the radial electromagnetic actuator 720 is small, a leakage path for the axial control magnetic flux may develop and a significant magnetic flux 722 may leak from the axial electromagnetic actuator 702 into the radial electromagnetic actuator 720 similar to the leakage flux 412 in FIG. 5.

FIG. 9 is a cross-sectional schematic of an electromagnetic actuator arrangement 700 per FIG. 7 showing a compensation flux 774a and 774b generated by the current 772 flowing in the bias flux leveling coil 770 that can counteract the magnetic flux leaking from the axial electromagnetic actuator 702 into the radial electromagnetic actuator 720. FIG. 9 shows a system as in FIG. 6 but with axial control coils 703a and 703b being energized with control currents 716a and 716b having opposite directions rather than the same directions as was the case with currents 407a and 407b in FIG. 6. As in FIG. 6, the electrical bias flux leveling coil 770 is energized with an electrical current 772 opposite in direction to the electrical control current 716a in the axial control coil 703a closest to the radial poles 724. The compensation current 772 produces compensation magnetic fluxes 774a and 774b which counteract the leakage magnetic flux 722 (see FIG. 8) in the radial control poles 724.

Figure 10:
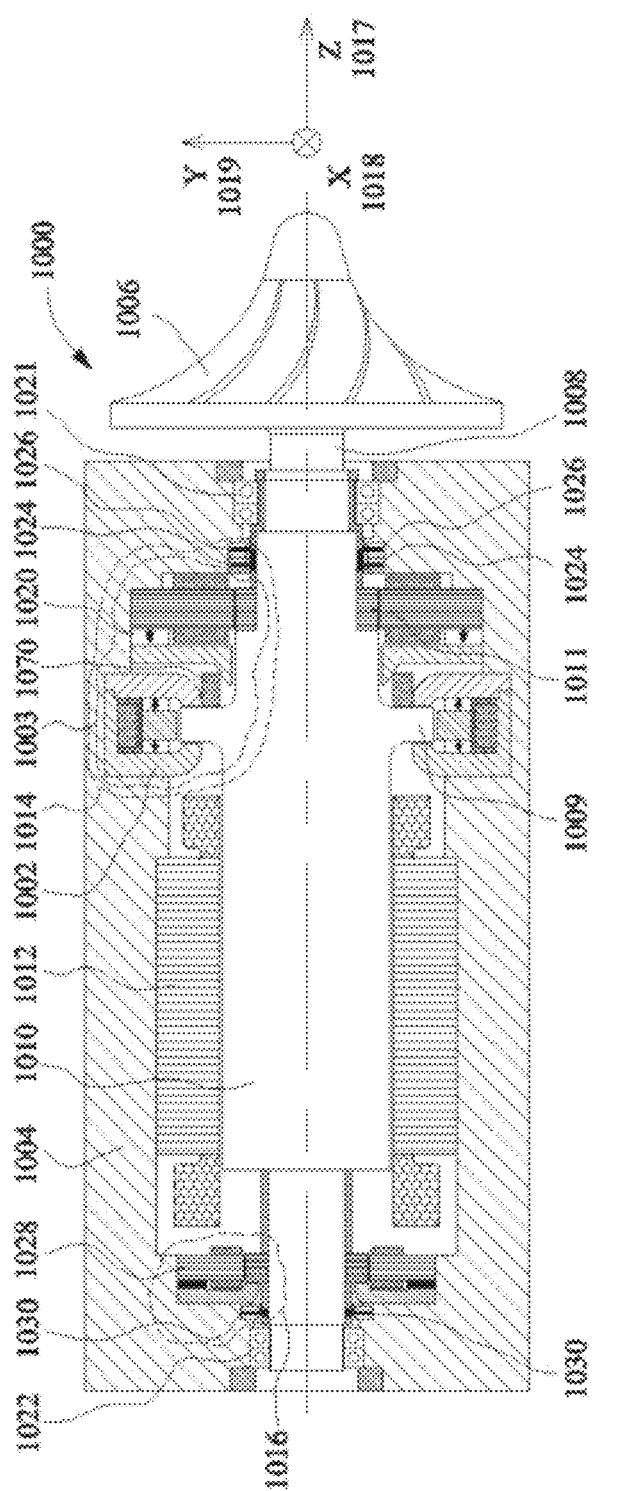
FIG. 10 is a cross-sectional schematic of an electric machine system incorporating an embodiment of the arrangement of radial and electromagnetic actuators in accordance with the present disclosure.
Figure 11:
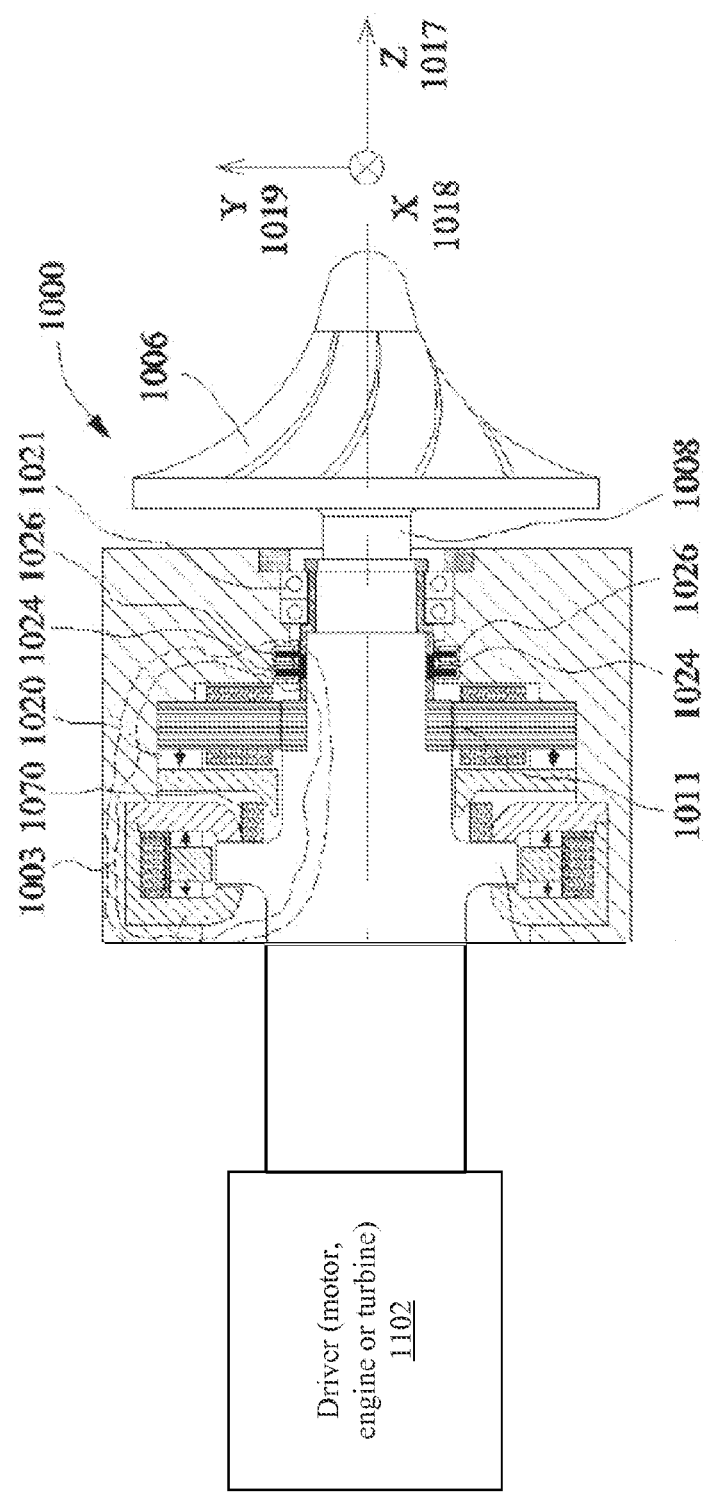
FIG. 11 is a cross-sectional schematic in which an embodiment of the arrangement of radial and electromagnetic actuators in accordance with the present disclosure is coupled to a driver which can be at least one of a motor, an engine, or a turbine.

In some aspects, the proposed arrangement of radial and axial electromagnetic actuators 100, 400, 700 or similar may be utilized as a part of an Active Magnetic Bearing (AMB) system to support a rotor of a rotational machine without a mechanical contact. FIG. 10 is a cross-sectional schematic of an electric machine system incorporating an embodiment of the arrangement of radial and axial electromagnetic actuators in accordance with the present disclosure. FIG. 10 shows an example of using an AMB system in an electric rotational machine 1000. The electric rotational machine 1000 can be, for example, an electric motor 1004 driving an impeller 1006 (e.g., liquid and/or gas impeller) mounted directly on the motor shaft 1008. The electric motor 1004 shown in FIG. 10 has a rotor 1010 and a stator 1012. Alternatively, the impeller 1006 can be driven by a flow of gas or liquid and spin the rotor 1010 attached to it through the motor shaft 1008. In this case the motor 1004 can be used as a generator which would convert the mechanical energy of the rotor 1010 into electricity. In embodiments, the rotor 1010 of the electric rotational machine 1000 can be supported radially and axially without mechanical contact by means of an arrangement 1014 of axial and radial AMBs at the front end of the machine and a radial AMB 1016 at the rear end. When the AMBs 1014 and 1016 are not working, the rotor rests on the mechanical backup bearings 1021 and 1022. The front backup bearing 1021 may provide the axial support of the rotor 1010 and a radial support of the rotor front end, whereas the rear backup bearing 1022 may provide radial support of the rear end of the rotor 1010. There are radial clearances between the inner diameters of the mechanical backup bearings 1021, 1022 and the outer diameters of the rotor portions interfacing with those bearing to allow the rotor 1010 to be positioned radially without touching the backup bearings 1021, 1022 when the AMBs 1014 and 1016 are activated. Similarly, there are axial clearances between the backup bearings 1021, 1022 and the portions of the rotor 1010 interfacing with those bearings to allow the rotor 1010 to be positioned axially without touching the backup bearings 1021 and 1022 when the AMBs 1014 and 1016 are activated. FIG. 11 is a cross-sectional schematic in which an embodiment of the arrangement of radial and electromagnetic actuators in accordance with the present disclosure is coupled to a driver 1102 which can be at least one of a motor, an engine, or a turbine.

The arrangement of axial and radial AMBs 1014 consists of an arrangement 1003 of an axial electromagnetic actuator 1002, a radial electromagnetic actuator 1020 and a bias flux leveling coil 1070 per present invention, axial position sensor 1026, radial position sensors 1024, and control electronics (not shown). The radial and axial electromagnetic actuator arrangement 1003 may be capable of exerting axial forces on the axial actuator target 1009 and radial force on the radial actuator target 1011, both rigidly mounted on the rotor 1010.

The axial force is the force in the direction of Z-axis 1017 and the radial forces are forces in the direction of X-axis 1018 (directed into the page) and the direction of Y-axis 1019. The axial electromagnetic actuator 1002 may have at least one coil and the axial force may be produced when that coil is energized with a control current. Similarly, the radial electromagnetic actuator 1020 may have at least two coils corresponding to each of the radial axes and the forces may be produced when the corresponding coils are energized with control currents produced by control electronics (not shown). The position of the front end of the rotor in space is constantly monitored by non-contact position sensors, such as radial position sensors 1024 and axial position sensors 1026. The non-contact position sensors 1024 can monitor the radial position of the rotor, whereas the position sensor 1026 monitors the axial position of the rotor.

Signals from the position sensors 1024 and 1026 may be input into the control electronics (not shown), which may generate currents in the control coils of the axial electromagnetic actuator 1002 and the radial electromagnetic actuator 1020 when it finds that the rotor is deflected from the desired position such that these currents may produce forces pushing the rotor back to the desired position.

Applying an electrical current to the electrical coil in the axial electromagnetic actuator 1002 in order to produce an axial force may affect the bias magnetic field in the radial electromagnetic actuator 1020. The effect will be stronger when the axial separation between the axial electromagnetic actuator 1002 and the radial electromagnetic actuator 1020 gets smaller, but this is typically what is desired because it makes the machine more compact and improves its rotor-dynamic performance. To reduce or eliminate the effect of the axial current on the radial bias, a bias flux leveling coil 1070 per the present invention is introduced between the axial electromagnetic actuator 1002 and the radial electromagnetic actuator 1020, which is energized with an electrical current whenever the coil in the axial electromagnetic actuator 1002 is energized with a current so that the bias flux in the radial electromagnetic actuator 1020 is maintained constant or nearly constant.

The rear AMB 1016 consists of an electromagnetic actuator 1028, radial non-contact position sensors 1030, and control electronics (not shown). It may function similarly to the front radial AMB 1020.

It is to be understood, that in addition to systems presented in FIGS. 1 through 10, the principles described herein can be applied to any other combination of various types of permanent-magnet-biased, electromagnetically-biased, homopolar, heteropolar, radial and axial actuators.

While this disclosure contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. An electromagnetic actuator system comprising:
an axial actuator system and a radial actuator system separated by an axial gap along a rotational axis;
the axial actuator system comprising:
a stationary first axial pole and a stationary second axial pole, the first and the second axial poles magnetically coupled to each other;
a body configured to rotate about the rotational axis, the first axial pole adjacent to and separated from a first end-facing surface of the body and the second axial pole adjacent to and separated from a second end-facing surface of the body, the first and second axial poles and the body configured to communicate magnetic flux;
an electrical axial control coil configured, when energized with a first current, to induce axial control magnetic flux flowing between the first axial pole and the first end-facing surface of the body as well as the second axial pole and the second end-facing surface of the body, the axial gap to cause a portion of the axial control magnetic flux to leak from the axial actuator system to the radial actuator system;

the radial actuator system comprising a plurality of radial poles positioned around a radial facing surface of the body, separated from the radial facing surface of the body and configured to communicate magnetic flux with the body;

an electrical bias flux leveling coil wound around the rotational axis, the electrical bias flux leveling coil being located axially between the plurality of radial poles and the closest of either the first or the second axial poles, the electrical bias flux leveling coil separate and electrically independent from the electrical axial control coil, and configured to produce magnetic flux in the plurality of radial poles, the body, and the first and second axial poles, the magnetic flux produced by the electrical bias flux leveling coil configured, when energized with a second current, to counteract the portion of the axial control magnetic flux leaking from the axial actuator system to the radial actuator system.

2. The electromagnetic actuator system of claim 1, wherein the plurality of radial poles are arranged radially outside of the body.

3. The electromagnetic actuator system of claim 1, wherein the radial actuator system comprises:

a stationary dead pole placed axially between the electrical bias flux leveling coil and the plurality of radial poles, the dead pole circumferentially surrounding the radial facing surface of the body, the dead pole separated from the radial facing surface of the body, the dead pole configured to communicate magnetic flux with the body; and an axially magnetized bias permanent magnet placed between the dead pole and the plurality of radial poles, the bias permanent magnet magnetically connected to the dead pole and the plurality of radial poles, wherein the bias permanent magnet generates a bias magnetic flux flowing through the dead pole into the body and from the body into the plurality of radial poles, wherein the magnetic flux produced by the electrical bias flux leveling coil is configured to maintain the bias magnetic flux constant by counteracting the portion of the axial control magnetic flux leaking from the axial actuator system to the radial actuator system.

4. The electric machine system of claim 2, wherein the radial actuator system further comprises:

a stationary dead pole placed axially between the electrical bias flux leveling coil and the plurality of radial poles, the dead pole circumferentially surrounding the radial facing surface of the body, the dead pole separated from the radial facing surface of the body, the dead pole configured to communicate magnetic flux with the body; and an axially magnetized bias permanent magnet placed between the dead pole and the plurality of radial poles, the bias permanent magnet magnetically connected to the dead pole and the plurality of radial poles, wherein the bias permanent magnet generates a bias magnetic flux flowing through the dead pole into the body and from the body into the plurality of radial poles, wherein the magnetic flux produced by the electrical bias flux leveling coil is configured to maintain the bias magnetic flux constant by counteracting the portion of the axial control magnetic flux leaking from the axial actuator system to the radial actuator system.

5. The electromagnetic actuator system of claim 1, further comprising:

an axial control current source configured to provide the first current to induce the axial control magnetic flux in the electrical axial control coil, wherein the portion of the axial control magnetic flux leaking from the axial actuator system to the radial actuator system is affected by an axial position of the body; and a compensation current source configured to provide the second current to induce the magnetic flux configured to counteract the portion of the axial control magnetic flux leaking from the axial actuator system to the radial actuator system, wherein the second current is a function of the first current and the axial position, and wherein the axial control current source is separate and electrically independent from the compensation current source.

6. The electromagnetic actuator system of claim 5, wherein the compensation current source comprises an amplifier.

7. A method of generating axial and radial electromagnetic forces, the method comprising:

generating, with an axial control current, an axial control magnetic flux in an axial control magnetic circuit comprising a first axial pole, a second axial pole, and an axial actuator target, the axial actuator target coupled to a body having a rotational axis and having a first end-facing surface and a second end-facing surface, the first and second end-facing surfaces orthogonal or substantially orthogonal to the rotational axis, the first axial pole and the second axial pole adjacent to and separated from the first and second end-facing surfaces, the first axial pole and the second axial pole magnetically coupled to each other;

generating a radial control flux in a radial control magnetic circuit comprising a first radial pole, a second radial pole and a radial actuator target, the radial actuator target having a cylindrical surface concentric or substantially concentric with the rotational axis, the first radial pole and the second radial pole positioned around the cylindrical surface of the radial actuator target and separated from the cylindrical surface of the radial actuator target, the first and the second radial poles magnetically coupled to each other, wherein the axial control magnetic circuit and the radial control magnetic circuit are separated by an axial gap along the rotational axis, the axial gap to cause a portion of the axial control magnetic flux to leak from the axial control magnetic circuit to the radial control magnetic circuit, wherein the portion of the axial control magnetic flux to leak from the axial control magnetic circuit to the radial control magnetic circuit being affected by the axial control current and an axial position of the body, wherein an electrical bias flux leveling coil is located axially between the radial poles and the closest of the first or the second axial poles and wound around the rotational axis, wherein the electrical bias flux leveling coil is located separately and electrically independently from an electrical axial control coil configured to induce the axial control magnetic flux; and generating a magnetic flux by energizing the electrical bias flux leveling coil with an electrical compensation current that is separate and electrically independent of the axial control current, the magnetic flux to cancel or nearly cancel the portion of the axial control magnetic flux leaking from the axial control magnetic circuit to the radial control magnetic circuit, wherein the electrical compensation current is a function of the axial control current and the axial position.

8. The method of claim 7, further comprising:
placing a dead pole axially between the electrical bias flux leveling coil and the plurality of radial poles, the dead pole circumferentially surrounding the cylindrical surface concentric or substantially concentric with the rotational axis, the dead pole separated from the cylindrical surface, the dead pole configured to communicate magnetic flux with the body; and
placing an axially magnetized bias permanent magnet between the dead pole and the plurality of radial poles, the bias permanent magnet magnetically connected to the dead pole and the plurality of radial poles, wherein the bias permanent magnet generates a bias magnetic flux flowing through the dead pole into the body and from the body into the plurality of radial poles,
wherein the magnetic flux produced by the electrical bias flux leveling coil is configured to maintain the bias magnetic flux constant by canceling or nearly canceling the portion of the axial control magnetic flux leaking from the axial actuator system to the radial actuator system.

9. The electric machine system of claim 7, wherein the compensation current source comprises an amplifier.

10. The method of claim 7, wherein generating the magnetic flux by energizing the electrical bias flux leveling coil with the electrical compensation current comprises generating the compensation current using a separate amplifier.

11. An electric machine system comprising:
a stator;
a rotor having a rotational axis configured to move relative to the stator;
an axial actuator system and a radial actuator system separated by an axial gap along the rotational axis;
the axial actuator system comprising:
a stationary first axial pole and a stationary second axial pole, the first and the second axial poles are magnetically coupled to each other,
an axial actuator target firmly attached to the rotor, the first axial pole adjacent to and separated from a first end-facing surface of the axial actuator target and the second axial pole adjacent to and separated from a second end-facing surface of the axial actuator target, the first and second axial poles and the axial actuator target configured to communicate magnetic flux;
an electrical axial control coil configured to induce axial control magnetic flux flowing between the first axial pole and the first end-facing surface of the axial actuator target as well as the second axial pole and the second end-facing surface of the axial actuator target; and
an axial control current source configured to provide an axial control current to induce the axial control magnetic flux in the electrical axial control coil;
the radial actuator system comprising:
a plurality of radial poles,
a radial actuator target firmly attached to the rotor, the radial poles positioned around a radial facing surface of the radial actuator target, separated from the radial facing surface of the radial actuator target, the radial poles are further configured to communicate magnetic flux with the radial actuator target;
an electrical radial control coil configured to induce radial control magnetic flux flowing between the radial poles and the peripheral surface of the radial actuator target,
wherein the axial gap causes a portion of the axial control magnetic flux to leak from the axial actuator system to the radial actuator system;
an electrical bias flux leveling coil wound around the rotational axis, the electrical bias flux leveling coil separate and electrically independent from the electrical axial control coil, the electrical bias flux leveling coil located axially between the radial poles and the closest of either the first or the second axial poles and configured to produce magnetic flux in the one or more radial poles, a body, and the first and second axial poles, the magnetic flux produced by the electrical bias flux leveling coil configured to counteract the portion of the axial control magnetic flux leaking from the axial actuator system to the radial actuator system, wherein the portion of the axial control magnetic flux that leaks from the axial actuator system to the radial actuator system is a function of the axial control current and an axial position of the body; and
a compensation current source configured to provide an electrical compensation current to induce the magnetic flux configured to counteract the portion of the axial control magnetic flux leaking from the axial actuator system to the radial actuator system, wherein the electrical compensation current is a function of the axial control current and the axial position of the body, and wherein the axial control current source is separate and electrically independent from the compensation current source.

12. The electric machine system of claim 11, wherein the rotor is coupled to an impeller.

13. The electric machine system of claim 11, wherein the rotor is coupled to a driver, the driver comprising at least one of a motor, an engine, or a turbine.

14. The electric machine system of claim 11, wherein an electronic control package is configured to control the axial and radial control magnetic fluxes by energizing electrical axial and radial control coil with control currents.

15. The electric machine system of claim 14, wherein the magnetic fluxes exert electromagnetic forces on the actuator target.

16. The electric machine system of claim 15, wherein an electronic control package is further configured to energize the electrical axial control coil and the electrical radial control coil with control currents in response to changes of signals from position sensors so that the rotor is supported by electromagnetic forces without a mechanical contact with the stator.

* * * * *

UNITED STATES PATENT AND TRADEMARK OFFICE
CERTIFICATE OF CORRECTION

PATENT NO. : 9,531,236 B2
APPLICATION NO. : 13/486194
DATED : December 27, 2016
INVENTOR(S) : Alexei Filatov It is certified that error appears in the above-identified patent and that said Letters Patent is hereby corrected as shown below:

In the Claims

In Column 13, Claim 4, Line 45, please replace "The electric machine system of claim 2" with -- The electromagnetic actuator system of claim 2 --

In Column 15, Claim 9, Line 22, please replace "The electric machine system of claim 7" with -- The method of claim 7 --

Signed and Sealed this
Seventeenth Day of March, 2020

Andrei Iancu
*Director of the United States Patent and Trademark Office*